US012592616B1

(12) United States Patent
Anger et al.

(10) Patent No.: US 12,592,616 B1
(45) Date of Patent: Mar. 31, 2026

(54) SERVO ACTUATOR WITH ELECTROMAGNETIC INTERFERENCE SHIELDING

(71) Applicant: Anduril Industries, Inc., Costa Mesa, CA (US)

(72) Inventors: Richard Anger, Costa Mesa, CA (US); Jason Flahie, Costa Mesa, CA (US); Riley Evers, Costa Mesa, CA (US); Michael Auda, Costa Mesa, CA (US); Mehran Ahmadi, Costa Mesa, CA (US); Hamza Abdul-Ghani, Costa Mesa, CA (US); Derek Goss, Costa Mesa, CA (US); Timothy Medina, Costa Mesa, CA (US); Serge Ossipian, Costa Mesa, CA (US); Richard David Young, Costa Mesa, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 18/783,909

(22) Filed: Jul. 25, 2024

Related U.S. Application Data

(60) Provisional application No. 63/516,795, filed on Jul. 31, 2023.

(51) Int. Cl.
H02K 11/00 (2016.01)
F16H 19/08 (2006.01)
(Continued)

(52) U.S. Cl.
CPC ............. H02K 11/02 (2013.01); F16H 19/08 (2013.01); F16H 49/001 (2013.01); F16H 57/029 (2013.01); H02K 5/06 (2013.01);

H02K 7/083 (2013.01); H02K 7/116 (2013.01); H02K 11/215 (2016.01); B64C 13/50 (2013.01); B64U 40/10 (2023.01); F16H 2057/02034 (2013.01); F16H 2057/02082 (2013.01); H02K 2211/03 (2013.01)

(58) Field of Classification Search
CPC ........ H02K 11/02; H02K 11/215; H02K 5/06; H02K 7/116; H02K 2211/03; F16H 19/08; F16H 49/001; F16H 57/029; F16H 2057/02034; F16H 2057/02082; B64U 40/10
See application file for complete search history.

(56) References Cited

U.S. PATENT DOCUMENTS

| | | | |
|---|---|---|---|
| 9,616,998 B2 | 4/2017 | Oakley et al. | |
| 10,057,663 B2 | 8/2018 | Sobanski et al. | |
| (Continued) | | | |

FOREIGN PATENT DOCUMENTS

| | | | | |
|---|---|---|---|---|
| CA | 2938948 A1 | * | 8/2014 | ........... F04D 25/028 |
| CH | 698177 B1 | * | 6/2009 | .......... F04C 15/0026 |
| (Continued) | | | | |

*Primary Examiner* — Zakaria Elahmadi
(74) *Attorney, Agent, or Firm* — Knobbe, Martens, Olson & Bear, LLP

(57) ABSTRACT

A servo actuator comprising an EMI seal positioned between the output shaft and the housing. The EMI seal forms a ring around the output shaft and comprises a plurality of finger springs intermittently positioned around the ring. The finger springs are formed from an electrically conductive material such as beryllium copper.

19 Claims, 7 Drawing Sheets

(51) Int. Cl.

| | | |
|---|---|---|
| *F16H 49/00* | (2006.01) | |
| *F16H 57/029* | (2012.01) | |
| *H02K 5/06* | (2006.01) | |
| *H02K 7/08* | (2006.01) | |
| *H02K 7/116* | (2006.01) | |
| *H02K 11/02* | (2016.01) | |
| *H02K 11/215* | (2016.01) | |
| B64C 13/50 | (2006.01) | |
| B64U 40/10 | (2023.01) | |
| F16H 57/02 | (2012.01) | |

(56) References Cited

U.S. PATENT DOCUMENTS

| | | | |
|---|---|---|---|
| 10,368,401 B2 | 7/2019 | Wen et al. | |
| 2012/0286629 A1 * | 11/2012 | Johnson | H02K 29/08 |
| | | | 310/68 B |
| 2023/0144408 A1 * | 5/2023 | Thompson | B64C 27/32 |
| | | | 244/17.23 |

FOREIGN PATENT DOCUMENTS

| | | | | |
|---|---|---|---|---|
| KR | 10-1856819 B1 | 5/2018 | | |
| WO | WO-2007082594 A2 * | 7/2007 | | B25J 9/1025 |

* cited by examiner

SERVO ACTUATOR WITH ELECTROMAGNETIC INTERFERENCE SHIELDING

CROSS-REFERENCE TO RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

This disclosure relates to servo actuators, in particular to servo actuators for actuating control surfaces, such as, for example, elevons, ailerons, tailerons, rudders, and/or thrust vector control systems of an aerial vehicle.

BACKGROUND

Servo actuators are used for many applications, including as a device for providing precise controlled movements. For example, a servo actuator may be used in unmanned aerial vehicles (UAVs) for providing precisely controlled movements of control surfaces and/or flaps such as elevons. Some servo actuators emit electromagnetic interference (EMI) which can be detected by EMI detection devices. Accordingly, servo actuators and devices attached to servo actuators may be detected by others implementing EMI detection devices.

BRIEF DESCRIPTION OF THE DRAWINGS

The foregoing and other features and advantages of the disclosure will become more fully apparent from the following description and appended claims, taken in conjunction with the accompanying drawings.

DETAILED DESCRIPTION

Figure 1:
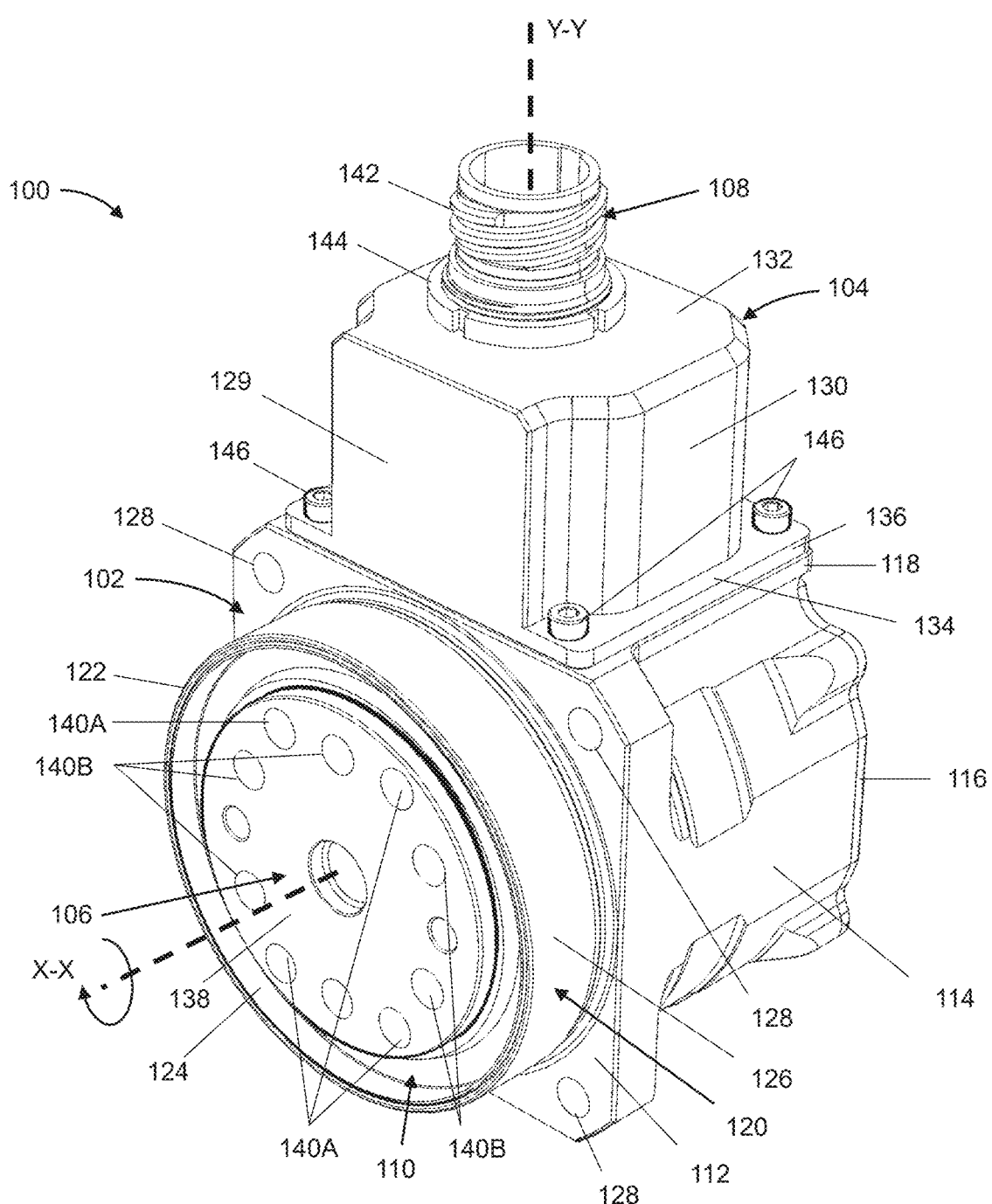
FIG. 1 is a perspective view of an embodiment of a servo actuator.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. Further, the illustrative embodiments described herein are not meant to be limiting. Other embodiments may be utilized, and other changes may be made, without departing from the spirit or scope of the disclosure presented. It will be readily understood that the aspects of the present disclosure described herein and illustrated in the figures can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the disclosure. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

Reference in the specification to directional terms may be used for purposes of describing the orientation and positioning of components of a servo actuator and/or UAV described herein. Accordingly, the following definitions will be used: a "midline" means a reference vertical line down the longitudinal or central axis of the servo actuator and/or UAV; "medial" means toward the midline or central axis of the servo actuator and/or UAV; "lateral" means away from the midline or central axis of the servo actuator and/or UAV; "anterior", or "ventral" means the front of the servo actuator and/or UAV; "posterior", or "dorsal" means the back of the servo actuator and/or UAV; "proximal" means towards or near a particular reference point; and "distal" means away or far from a particular reference point. Furthermore, "forward" means at, near, or toward the bow or nose of an aircraft or vehicle while "aft" means at, near, or toward the stern or tail of an aircraft or vehicle.

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages to servo actuators with electromagnetic interference shielding.

As mentioned above, some servo actuators emit electromagnetic interference (EMI) which can be detected by EMI detection devices. Accordingly, servo actuators and devices attached to servo actuators may be detected by others implementing EMI detection devices. Attempts have been made to contain EMI from being emitted from electronic devices. Some servo actuators comprise electrically conductive materials surrounding the electronics to attempt to limit EMI. However, some configurations and compositions of electrically conductive materials have limited effectiveness. Some applications have limited effectiveness in a static environment. Furthermore, some configurations and compositions are ineffective in preventing EMI from emitting between rotating surfaces.

Additionally, in some devices, the surfaces of sensitive electronics are anodized to provide a protective oxide layer to prevent corrosion. Anodization changes the crystal structure of the surface such that the surface loses its electroconductivity. Accordingly, anodized surfaces are ineffective in shielding EMI from being emitted. There remains a need for improved devices, systems, compositions, and methods to more effectively shield servo actuators.

There remains a need for improved devices, systems, compositions, and methods to more effectively shield servo actuators. According to some embodiments, devices, systems, compositions, and methods have been developed and disclosed herein to more effectively shield servo actuators, including servo actuators with exterior-facing rotating bodies. In one aspect of the present disclosure, a servo actuator comprising a motor, a geartrain, and an output shaft within a base housing is disclosed. According to some embodiments, the output shaft may be the only subcomponent of the servo actuator that is exposed to the exterior of the servo actuator. The base housing may be formed of an electroconductive material. The faying surfaces of the base housing may not be anodized for preserving the electroconductive properties of the faying surfaces. A sealing ring and/or gap filler may be inserted between the output shaft and the base housing for providing EMI shielding. The sealing ring and/or gap filler may be a ring made of one or more electroconductive materials.

In a first aspect of the following disclosure, a servo actuator comprises a housing having a plurality of exterior surfaces defining a cavity, one of the plurality of exterior surfaces defining an opening, the opening having an interior surface extending into the cavity of the housing in a direction orthogonal to the one of the plurality of exterior surfaces; a motor mounted within the cavity of the housing, the motor having a first output shaft also referred to as a drive shaft (hereinafter "drive shaft"); a geartrain operatively coupled to the drive shaft, the geartrain having a second output shaft (hereinafter "output shaft") positioned in the opening of the housing; a sensor configured to monitor the position of the output shaft; one or more control boards electrically connected to the motor and the sensor; and a sealing ring positioned between the output shaft and the interior surface of the opening, wherein the sealing ring comprises an electrically conductive material and is configured and positioned to fill a gap between the output shaft and the interior surface of the opening.

In one aspect, the servo actuator comprises a cross roller bearing operatively coupling the output shaft and the interior surface of the opening. In one aspect, the width of the output shaft of the geartrain is greater than the length of the output shaft of the geartrain. In one aspect, the sensor is an encoder. In one aspect, the drive shaft and the output shaft are coaxial. In one aspect, the geartrain is a strain wave drive. In one aspect, the sealing ring is a ring comprising at least one spring. In one aspect, the sealing ring is radially flexible. In one aspect, the ring comprises a plurality of finger springs. In one aspect, the plurality of finger springs are made of beryllium copper. In one aspect the sealing ring is secured between the output shaft and the interior surface of the opening with electroconductive epoxy. In one aspect, the sealing ring is configured to provide shielding from electromagnetic interference (EMI). In one aspect, the housing is formed of electrically conductive material. In one aspect, the housing comprises aluminum.

In another aspect, a servo actuator comprises a housing having a plurality of exterior surfaces defining a first cavity and a second cavity, at least one of the plurality of exterior surfaces defining an opening, the opening having an interior surface extending into the first cavity of the housing in a direction orthogonal to the one of the plurality of exterior surfaces; a motor mounted within the first cavity of the housing, the motor having a drive shaft; a strain wave drive mounted within the first cavity of the housing and operatively coupled to the drive shaft at an anterior end, the strain wave drive having a output shaft positioned within the opening of the housing; a sensor mounted within the first cavity of the housing and configured to monitor the angular position of the output shaft; a servo driver controller board mounted within the second cavity of the housing and electrically connected to the motor and the sensor; a servo driver power board mounted in parallel relative to the servo driver controller board within the second cavity of the housing and electrically connected to the servo drive controller board; and a sealing ring positioned between the output shaft and the interior surface of the opening; wherein the sealing ring is formed of an electrically conductive material.

In one aspect, the servo actuator has a rotational range from −90 degrees to +90 degrees. In one aspect, the servo actuator tracks an absolute position of the output shaft without the need to initialize the servo actuator during use. In one aspect, the servo actuator has a max rotational velocity of more than 160 degrees per second (deg/s) during use. In one aspect, the servo actuator has a max rotational velocity of more than 160 degrees per second that is maintainable for at least five seconds during use. In one aspect, the servo actuator has a max rotational velocity of more than 160 degrees per second that is maintainable for at least five seconds under a load of at least 14 Newton-meters (Nm) of applied torque during use. In one aspect, the servo actuator has a rotational acceleration of more than 15,000 degrees per second squared ($deg/s^2$) that is maintainable for at least five seconds under a load of at least 14 Newton-meters of applied torque during use. In one aspect, the servo actuator has a rotational acceleration of at least 2,000 degrees per second squared and an RMS acceleration of at least 400 degrees per second squared that is maintainable for an operational time of at least twenty-five minutes under a load of up to 4 Newton-meters or more of applied torque during use. In one aspect, the servo actuator has a rotational acceleration of at least 2,000 degrees per second squared and an RMS acceleration of at least 400 degrees per second squared that is maintainable for an operational time of at least twenty-five minutes under a load of up to 14 Newton-meters or more of applied torque during use. In one aspect, the servo actuator has a rotational acceleration of at least 2,000 degrees per second squared and an RMS acceleration of at least 400 degrees per second squared that is maintainable for an operational time of at least twenty-five minutes under a load of up to 20 Newton-meters or more of applied torque during use. In one aspect, the servo actuator has a rotational acceleration of at least 2,000 degrees per second squared and an RMS acceleration of at least 400 degrees per second squared that is maintainable for an operational time of at least twenty-five minutes under a load of up to 33 Newton-meters or more of applied torque during use. In one aspect, the servo actuator comprises a backdrivable motor. In one aspect, the servo actuator comprises a strain wave geartrain with maximum backlash of less than about 0.2 degrees. In one aspect, the servo actuator has a mass less than about 600 grams.

FIG. 1 shows a perspective view of a servo actuator 100 comprising a base housing 102, an upper housing 104, a motor assembly 106, a connector 108, and a cover 110.

The base housing 102 may have a plurality of exterior surfaces. The plurality of exterior surfaces of the base housing 102 may comprise a front face 112, two side faces 114, a rear face 116, a top face 118, and a bottom face. In some embodiments, the base housing 102 is made of an electrically conductive material. For example, the base housing 102 may be made from aluminum, copper, gold, silver, iron, zinc, nickel, beryllium and combinations or alloys thereof such as beryllium copper or nickel silver. The electrically conductive material may advantageously contain electromagnetic interference (EMI) and limit and/or prevent the EMI from being emitted from the base housing 102. The electrically conductive materials may also resist corrosion. In some embodiments, the plurality of exterior surfaces may be anodized. Anodizing the exterior surfaces may provide a protective exterior layer to the base housing 102. In some embodiments, a plurality of faying surfaces of the base housing 102 may not be anodized.

The front face 112 may be located in an anterior position relative to a Y-Y axis. The front face 112 may further comprise a wall 120. The wall 120 may comprise one or more segments extending in an anterior direction from the front face 112 of the base housing 102 culminating in a rim 122 defining an outer edge of the wall 120. The shape of the wall 120 may be defined by a number of segments. For example, the wall 120 may comprise a single segment in the shape of a circle. In some embodiments, the wall 120 may extend generally perpendicular to the front face 112.

The wall 120 may define an opening in the front face 112. The opening may provide access to the cavity of the base housing 102. Each of the one or more segments of the wall 120 may have an inner surface 124 and an outer surface 126 defining a thickness. In some embodiments, the thickness of each of the one or more segments of the wall 120 may be the same. Additionally, the rim 122 may have the same dimension as the thickness between the inner surface 124 and the outer surface 126. The opening defined by the wall 120 may be confined within the inner surface 124 of the wall 120 extending into the cavity of the base housing 102 in a direction orthogonal to the front face 112. In some embodiments, the opening may be centered about the X-X axis.

The wall 120 may have an interior dimension between two opposing points of the inner surface 124. For example, the wall 120 may have an inner diameter extending between two points of the inner surface 124 and passing through the center point of the wall 120 having a circular shape.

The front face 112 may further comprise one or more openings 128. The one or more openings 128 may be configured to engage with a fastener and used to couple the servo actuator 100 to an actuated device. In some embodiments, the fastener may be a screw, bolt, or other threaded device to extend through the one or more openings 128 and a corresponding mounting surface of an external mounting object. In some embodiments, the external mounting object may be a vehicle. For example, the external mounting object may be an aerial vehicle such that the actuator is mounted to the frame of the aerial vehicle and configured to actuate a moving part of the aerial vehicle.

The two side faces 114 may be located laterally of a longitudinal axis X-X. The two side faces 114 may be coupled to and extend distally from the front face 112. In some embodiments, the two side faces 114 may extend perpendicularly from the front face 112.

The rear face 116 may be located distally at a posterior position relative to a Y-Y axis. The rear face 116 may be coupled to the two side faces 114. In some embodiments, the rear face 116 may be secured to the two side faces 114 via one or more fasteners. The rear face 116 may be perpendicular to the two side faces 114. In some embodiments, the rear face 116 may be removably coupled to the base housing 102. The rear face 116 may be secured to the base housing 102 via fasteners such as screws.

The top face 118 may be located superior to the longitudinal axis X-X. The top face 118 may be coupled to a top surface of each of the front face 112, the two side faces 114, and the rear face 116. In some embodiments, the top face 118 may be orthogonal to each of the front face 112, the two side faces 114, and the rear face 116. In some embodiments, the top face 118 may be orthogonal to the front face 112 and the rear face 116.

The bottom face may be located inferior to the longitudinal axis X-X. The bottom face may be coupled to a bottom surface of each of the front face 112, the two side faces 114, and the rear face 116. The bottom face may be orthogonal to each of the front face 112, the two side faces 114, and the rear face 116. In some embodiments, the bottom face may be orthogonal to the front face 112 and the rear face 116.

The plurality of exterior surfaces of the base housing 102 may define one or more cavities within the base housing 102. The one or more cavities of the base housing 102 may be sized to receive a motor assembly 106.

The upper housing 104 may similarly comprise a plurality of exterior surfaces. The plurality of exterior surfaces of the upper housing 104 may similarly comprise a front face 129, two side faces 130, a rear face, a top face 132, and a bottom face 134. In some embodiments, the upper housing 104 is made of an electrically conductive material. For example, the base housing 102 may be made from aluminum, copper, gold, silver, iron, zinc, nickel, beryllium and combinations or alloys thereof such as beryllium copper or nickel silver. The electrically conductive material may advantageously contain EMI and prevent the EMI from being emitted from the upper housing 104. The electrically conductive materials may also resist corrosion. In some embodiments, the plurality of exterior surfaces may be anodized. Anodizing the exterior surfaces may provide a protective exterior layer to the upper housing 104. In some embodiments, a plurality of faying surfaces of the upper housing 104 may not be anodized.

The front face 129 may be located in an anterior position relative to a Y-Y axis. In some embodiments, the front face 129 may be coplanar with the front face 112 of the base housing 102.

The two side faces 130 may be located laterally of a longitudinal axis X-X. The two side faces 130 may be coupled to and extend distally from the front face 129. In some embodiments, the two side faces 130 may extend perpendicularly from the front face 129.

The rear face of the upper housing 104 may be located posterior to the front face 129 at a posterior position relative to a Y-Y axis. In some embodiments, the rear face may be coplanar with the rear face 116 of the base housing 102. In some embodiments, the rear face may be positioned anterior relative to the rear face 116 of the base housing 102.

The top face 132 may be coupled to a top surface of each of the front face 129, the two side faces 130, and the rear face. In some embodiments, the top face 132 may comprise an opening for engaging with the connector 108.

The bottom face 134 may be coupled to a bottom surface of each of the front face 129, the two side faces 130, and the rear face. In some embodiments, the bottom face 134 may comprise a tab portion 136 extending beyond the two side faces 130. In some embodiments, the tab portion 136 may extend beyond the rear face of the upper housing 104.

The plurality of exterior surfaces of the upper housing 104 may define one or more cavities within the upper housing 104. In some embodiments, the base housing 102 and the upper housing 104 may be coupled together and define a common cavity extending between the base housing 102 and the upper housing 104. In some embodiments, the cavity of the upper housing 104 may be sized to receive system electronics.

The motor assembly 106 may comprise a motor mounted within the cavity of the base housing 102 and a geartrain operatively coupled to the motor, the geartrain having a output shaft 138. The output shaft 138 may have an anterior face comprising a plurality of openings 140A, 140B. In some embodiments, the plurality of openings 140A, 140B comprise a first set of openings 140A and a second set of openings 140B. In some embodiments, the first set of openings 140A may have a larger diameter than the second set of openings 140B.

The connector 108 may be a cylindrical component having an indented collar defined between a retention member 144 and a flange. The connector 108 may comprise a connector housing, one or more contacts, and a contact finish coating the one or more contacts. The connector 108 may electrically couple the servo actuator 100 to other electronic components such as a power source and/or controller. In some embodiments, the connector 108 may further comprise a coupling nut, a ratchet mechanism in the coupling mechanism, an insulator, a contact retention clip, a seal, and/or a spring. The connector may be configured to connect to electrical wire ranging from 6 American wire gage (AWG) to 4/0 AWG and configured to withstand 200 amps. The insulator may be high-grade rigid dielectric. The seal may be an o-ring or grommet.

The connector housing may include threads 142 on an exterior surface of a first end of the connector 108. The retention member 144 may include threads on an interior surface. The threads of the retention member 144 may correspond to the threads 142 of the connector 108. The retention member 144 may have an inner diameter greater than the outer diameter of the connector 108. The retention member 144 may be linearly adjusted along the length of the connector 108 by rotating the retention member 144 about the threads 142. Additionally, the connector housing may include a flange on a second end of the connector 108 opposite the first end. The flange may be sized larger than the opening of the upper housing 104. In some embodiments, the connector housing and coupling nut of the connector 108 may comprise an aluminum alloy or stainless steel finish. The retention clip may be made from a beryllium copper alloy. The seal may be made from fluorosilicone rubber. The spring may be made of a nickel-plated beryllium copper alloy. The ratchet mechanism in the coupling mechanism may advantageously prevent de-mating under severe vibration.

The cover 110 may be a circular ring defining a central opening. The diameter of the central opening may be the same as or marginally larger than the outer diameter of the output shaft 138 of the motor assembly 106. The outer diameter of the cover 110 may be the same as or marginally smaller than the inner diameter of the wall 120. The cover 110 may form a "U" shape having a bumper portion defining an interior wall, a base portion extending from the bumper portion in the radial direction, and a wall portion extending from the base portion in the longitudinal direction. The bumper portion may be configured to engage with the output shaft 138 of the motor assembly 106. The wall portion may be configured to engage with the inner surface 124 of the wall 120. The cover 110 may prevent dust and debris from entering the cavity of the base housing 102.

The base housing 102 and the upper housing 104 may be permanently or non-permanently coupled together. In some embodiments, the top face 118 of the base housing 102 may mate with the bottom face 134 of the upper housing 104. In some embodiments, the base housing 102 and the upper housing 104 may be non-permanently coupled to one another about the mated faces via one or more fasteners 146. For example, the one or more fasteners 146 may be threaded screws configured to extend through the bottom face 134 of the upper housing 104 and engage with the top face 132 of the base housing 102.

The motor assembly 106 may be housed within the cavity of the base housing 102. In some embodiments, the motor assembly 106 may be slidably inserted into the cavity of the base housing 102 through the rear side of the base housing 102. The rear face 116 may be coupled to the rest of the base housing 102 after the motor assembly 106 is secured within the cavity.

The output shaft 138 may be centered and configured to rotate about the X-X axis. The output shaft 138 may be positioned in the opening of the base housing 102 defined by the wall 120. In some embodiments, the output shaft 138 may be concentric with the opening of the base housing 102 defined by the wall 120. Additionally, the output shaft 138 may have an anterior face sharing the same shape as the wall 120 defined by the one or more segments. In some embodiments, the output shaft 138 may be circular having an outer diameter. In some embodiments, the inner diameter of the wall 120 may be a first diameter and the outer diameter of the output shaft 138 may be a second diameter. In some embodiments, the first diameter is greater than the second diameter such that a gap exists between the outer longitudinal surface of the output shaft 138 and the inner surface 124 of the wall 120.

The output shaft 138 may have an anterior surface parallel with the front face 112 of the base housing 102. In some embodiments, the anterior surface of the output shaft 138 may be coplanar with the rim 122 of the wall 120. In some embodiments, the anterior surface of the output shaft 138 extends in the anterior direction relative to the rim 122 of the wall 120.

The connector 108 may be configured to engage with an opening in the top face 132 of the upper housing 104. The connector 108 may be inserted from the cavity side through the top face 132 of the upper housing 104. A flange may be sized larger than the opening such that the connector 108 does not completely pass through the opening of the top face 132 of the upper housing 104. The retaining member 144 may be rotated about the threads 142 and may be tightened against the top face 132 of the upper housing 104 to secure the connector.

Figure 2A:
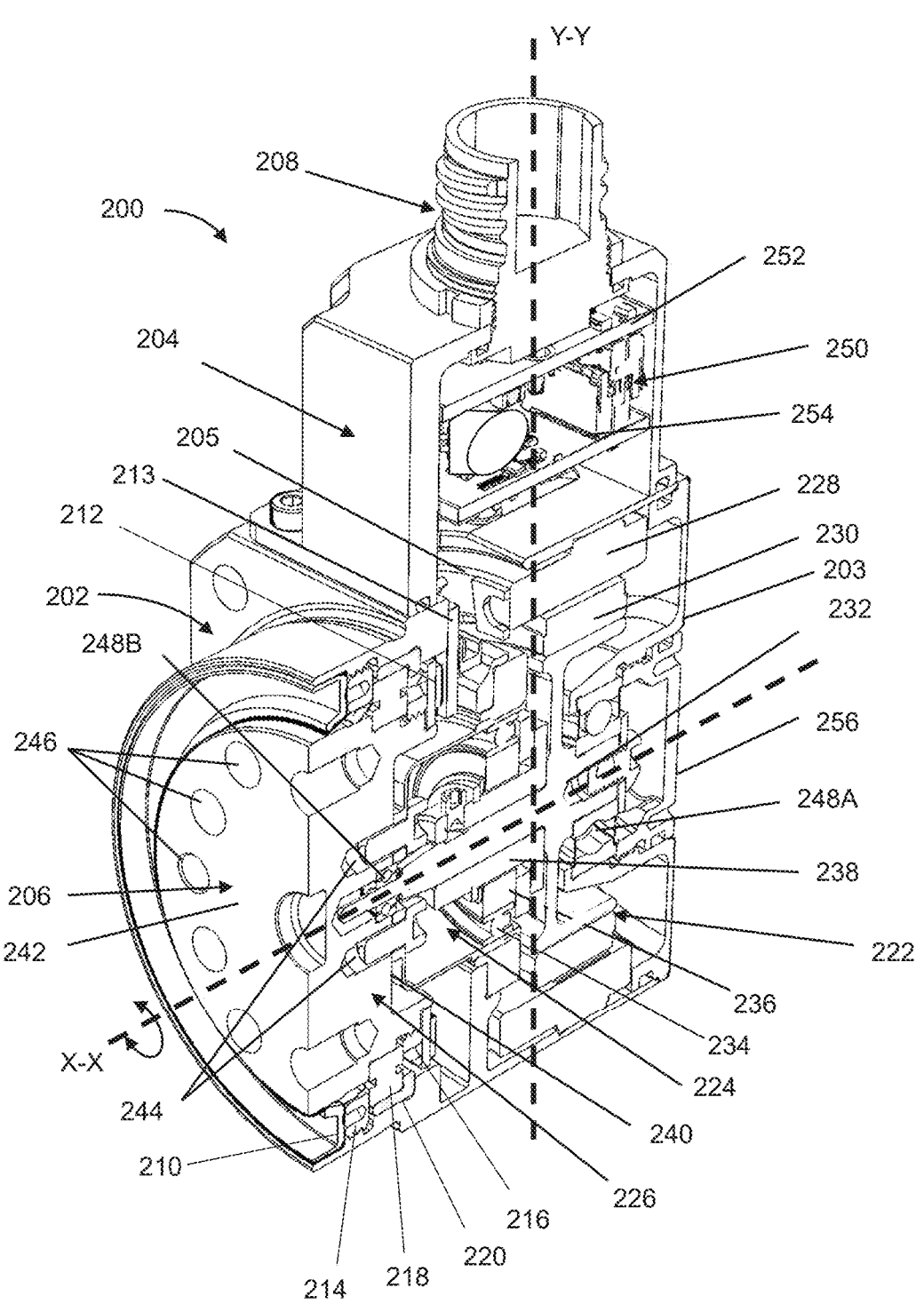
FIG. 2A is a cross-sectional perspective view of the servo actuator of FIG. 1.
Figure 2B:
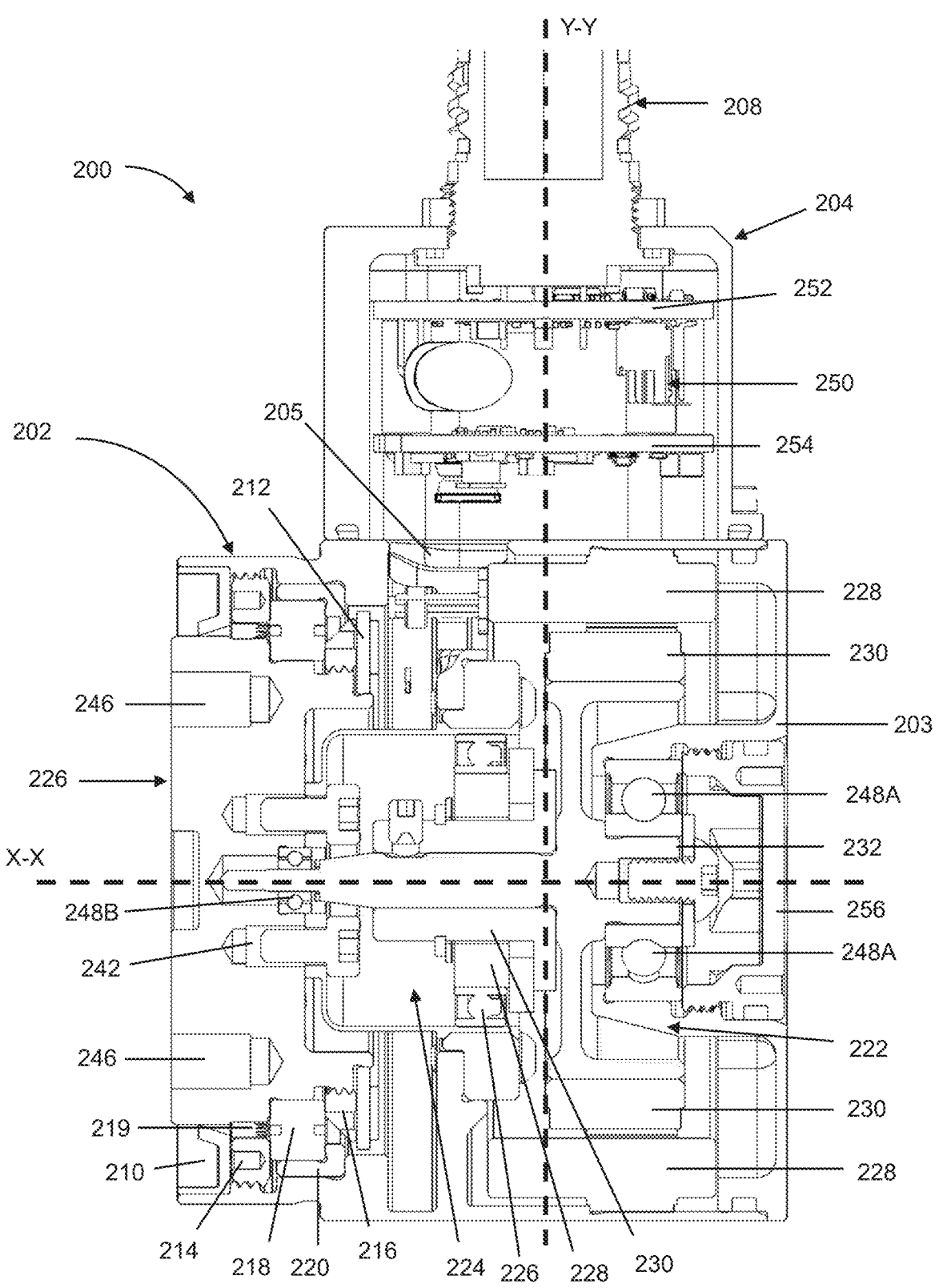
FIG. 2B is a cross-sectional side view of the servo actuator of FIG. 1.

FIGS. 2A and 2B show cross-sectional views of a servo actuator 200. The servo actuator 200 may comprise a base housing 202, a rear face 203, an upper housing 204, an opening 205, a motor assembly 206, a connector 208, and a cover 210. The servo actuator 200 may be the same as the servo actuator 100 described above such that the base housing 202, the upper housing 204, the motor assembly 206, the connector 208, and the cover 210 may be the base housing 102, the upper housing 104, the motor assembly 106, the connector 108, and cover 110, respectively. Similarly, the X-X and Y-Y axes shown in FIG. 2A may be the same as the X-X and Y-Y axes shown in FIG. 1.

The base housing 202 may comprise the motor assembly 206, one or more sensors 212, and a plurality of bearings, washers, and/or support rings positioned within the cavity of the base housing 202 to support the motor assembly 206. In some embodiments, the plurality of bearings, washers, and/or support rings may comprise a first support ring 214, a second support ring 216, a bearing 218, a gap filler and/or sealing ring 219 and a spacer 220.

The rear face 203 may be positioned on a posterior end of the base housing 202. The rear face 203 may comprise a mounting portion. The mounting portion may extend in the anterior direction within the cavity of the base housing 202.

In some embodiments, the mounting portion may be sized to receive a bearing and engage with and support a posterior end of the motor assembly 206.

The cavity of the upper housing 204 may be connected to the cavity of the base housing 202 via the opening 205. The opening 205 may provide access to the base housing 202 from the upper housing 204.

The motor assembly 206 may further comprise a motor 222 with a drive shaft 232, and a geartrain 224 culminating in an output shaft 226. The output shaft 226 may be the output shaft 138.

The sensor 212 may measure actuating movements of the motor assembly 206. In some embodiments, the sensor 212 may measure rotational movements of the geartrain 224 and/or rotational movements of the output shaft 226. For example, the sensor 212 may track the change in angular displacement of the output shaft 226. The sensor 212 may read the absolute position of the geartrain 224 and/or output shaft 226. In some embodiments, the sensor 212 may have between 18 and 21 bits. For example, the sensor 212 may have a 19-bit pattern. A 19-bit pattern may advantageously provide accurate measurements up to 1/560,000ths of a rotation. The sensor 212 may be sized to meet 30 hertz 1.25 degree amplitude bandwidth. Operating under 30 hertz may advantageously enhance stability by providing quick response time for a precise control of the servo actuator 200. In some embodiments, the sensor 212 may be an encoder. For example, the sensor 212 may be an encoder ring having a circular shape with a central opening. The sensor 212 may further comprise a sensor board 213 comprising pins for interconnecting the sensor 212 to system electronics. In some embodiments, the sensor 212 may be a 19-bit off-axis rotary absolute encoder. Furthermore, the sensor 212 may detect magnetic fields. In some embodiments, the sensor 212 may be a magnetic encoder having hall effect sensors. For example, the sensor 212 may be an RLS™ magnetic encoder such as the RLS MB049 19-bit absolute encoder. In some embodiments, the sensor 212 may use a bidirectional serial synchronous (BiSS-C) interface. Additionally and/or alternatively, the sensor 212 may use a serial peripheral interface (SPI).

The first support ring 214 or first retainer may be a circular object having an inner rim defining a central opening. The central opening may have a diameter greater than at least a portion of an outer diameter of the motor assembly 206 such that at least a portion of the motor assembly 206 may fit inside the central opening and be supported by the first support ring 214. For example, central opening may have a diameter greater than the outer diameter of the output shaft 226. In some embodiments, the central opening of the first support ring 214 may be concentric with the motor assembly 206. Additionally, the first support ring 214 may have an outer surface having a circumference. The circumference may be sized to engage with the interior surface of the base housing 202. In some embodiments, the first support ring 214 may have jaws or a central opening configured to grip the outer diameter of the motor assembly 206. For example, the first support ring 214 may be a spanner nut.

The second support ring 216 or second retainer may be similar to the first support ring 214. The second support ring 216 may be a circular object having an inner rim defining a central opening. The central opening may have a diameter greater than at least a portion of an outer diameter of the motor assembly 206 such that at least a portion of the motor assembly 206 may fit inside the central opening and be supported by the second support ring 216. In some embodiments, the central opening of the second support ring 216 may be smaller than the central opening of the first central opening. In some embodiments, the central opening of the second support ring 216 may be concentric with the motor assembly 206. Additionally, the second support ring 216 may have an outer surface having a circumference. The circumference may be sized to engage with the interior surface of the base housing 202. In some embodiments, the second support ring 216 may have jaws or a central opening configured to grip the outer diameter of the motor assembly 206. For example, the second support ring 216 may be a spanner nut.

The bearing 218 may be a circular object having an outer rim and a central opening. The outer rim of the bearing 218 may comprise an inner ring, an outer ring and a plurality of load bearers such as balls or rollers. In some embodiments, the outer ring has a central opening defining an inner surface of the outer ring, the inner surface of the outer ring having a first circumference. In some embodiments, the inner ring has an outer surface having a second circumference. In some embodiments, the inner ring has an inner surface defining the central opening of the outer rim of the bearing 218. In some embodiments, the first circumference is larger than the second circumference such that the inner ring may fit inside the central opening of the outer ring. In some embodiments, the plurality of load bearers are positioned between the outer surface of the inner ring and the inner surface of the outer ring. In some embodiments, inner and outer rings are at right angles to each other. In some embodiments, the bearing 218 may be a cross roller bearing. The cross roller bearing may advantageously provide high load capacity and high moment bearing capacity. The bearing 218 may be configured to hold the load of the servo actuator 200.

The gap filler and/or sealing ring 219 may be a circular object having a thickness. The gap filler and/or sealing ring 219 may have an outer diameter smaller than the inner diameter of the first support ring 214 and an inner diameter greater than the outer diameter of the output shaft 226. The gap filler and/or sealing ring 219 may be configured to absorb and/or block EMI from emitting from the front face of the base housing 202 of the servo actuator 200. The gap filler and/or sealing ring 219 may be a dynamic EMI seal. In some embodiments, the gap filler and/or sealing ring 219 may be made of an electroconductive material. In some embodiments, the gap filler and/or sealing ring 219 may comprise a plurality of finger springs. In some embodiments, the finger springs may be formed from beryllium copper. The gap filler and/or sealing ring 219 is described in further detail below.

The central opening of the bearing 218 may have a diameter greater than at least a portion of an outer diameter of the motor assembly 206 such that at least a portion of the motor assembly 206 may fit inside the central opening and be supported by the bearing 218. In some embodiments, the central opening of the bearing 218 may be concentric with the motor assembly 206.

The spacer 220 may be a circular object having an outer rim defining a central opening. The central opening may have a diameter greater than at least a portion of the outer diameter of the bearing 218 such that at least a portion of the bearing 218 may fit inside the central opening and be supported by the spacer 220. In some embodiments, the spacer 220 may be positioned between the inner wall of the base housing 202 and the bearing 218. For example, the outer diameter of the spacer 220 may be smaller than the inner diameter of the base housing 202 and configured to be inserted within the cavity defined by the base housing 202 and the diameter of the central opening of the spacer 220 may be larger than the outer diameter of the bearing 218 and configured to receive the bearing 218. In some embodiments, the central opening of the spacer 220 may be concentric with the motor assembly 206.

The motor 222 may be an electric motor configured to provide a rotational output of a shaft. In some embodiments, the motor 222 may be a rotary servo motor to output precise torque and speed.

The motor 222 may further comprise a stator 228, a rotor 230, and a drive shaft 232. The stator 228 may comprise a core with steel laminations and coils of wire inserted within the steel laminations configured to generate a magnetic field within an inner cavity of the stator 228. The rotor 230 may comprise a plurality of uniformly spaced conductive materials arranged in a ring having an outer surface and an interior surface. The rotor 230 may be inserted within the inner cavity of the stator 228. The rotor 230 may be configured to rotate in response to the magnetic field generated by the stator 228. The drive shaft 232 may have a base portion and an elongated protrusion extending longitudinally from the base portion. In some embodiments, one or more of the stator 228, the rotor 230, and/or the drive shaft 232 may have a circular cross-section in a transverse direction orthogonal to the longitudinal X-X axis. The stator 228 may have an inner diameter greater than an outer diameter of the rotor 230. The rotor may have an inner diameter greater than an outer diameter of the drive shaft 232. In some embodiments, the motor 222 may be a frameless brushless DC motor. For example, the motor 222 may be a direct drive torque motor.

The motor 222 may be in proximity to a thermal sensor for monitoring the temperature of the motor 222. In some embodiments, a thermistor may be thermally coupled to the stator 228 for collecting the temperature of the stator 228. The thermistor may be connected to system electronics for monitoring the temperature of the motor.

The geartrain 224 may comprise a plurality of gears for converting an input rotation into an output rotation. In some embodiments, the plurality of gears may provide a gear ratio. The geartrain 224 may transmit and alter an input to the geartrain 224 to an output of the geartrain 224.

In some embodiments, the geartrain 224 may be a strain wave geartrain having an outer spline 234, an inner spline 236, and a central plug 238. The central plug 238 may be coupled to an input. The outer spline 234 may be coupled to an output. The inner spline 236 may be a transmission interface to transmit an input to the geartrain 224 to an output of the geartrain 224. The outer spline 234 may have gearing and/or teeth located on an interior surface of the outer spline 234. The inner spline 236 may have gearing and/or teeth located on an exterior surface of the inner spline 236. The gearing and/or teeth of the outer spline 234 and inner spline 236 may be configured to mesh together. The outer spline 234, the inner spline 236, and the central plug 238 may be coaxially nested wherein the central plug 238 is positioned within the inner spline 236, and the inner spline 236 is positioned within the outer spline 234. The outer spline 234 may be rigid and have a circular cross-section. The inner spline 236 may be elastic and/or flexible. The inner spline 236 may have a default circular cross-section. The central plug 238 may be elliptical such that the central plug 238 deforms the flexible inner spline 236 from having a circular cross-section to an elliptical cross-section. The elliptical cross-section of the inner spline 236 may advantageously minimize friction by meshing fewer than all of the teeth of the inner spline 236 with the teeth of the outer spline

234. The geartrain 224 may advantageously provide little to no backlash, provide high gear rations, have high torque capability, and have coaxial input and output shafts. In some embodiments, the geartrain 224 may define a lumen extending through the central plug 238. The strain wave geartrain is a lightweight and compact geartrain configured to provide high torque speed direction capability. In some embodiments, the geartrain 224 may provide 50:1 ratio.

The output shaft 226 may transmit the output torque of the servo actuator 200 to a coupled device. The output shaft 226 may further comprise a posterior face 240 and an anterior face 242. The posterior face 240 may comprise a plurality of mounting surfaces 244. The plurality of mounting surfaces 244 may be configured to mount the output shaft 226 to the geartrain 224. In some embodiments, the plurality of mounting surfaces 244 may be threaded cavities within the output shaft 226 configured to receive a threaded bolt. As described above, the output shaft 226 further comprises a plurality of openings 246 (FIG. 2A only identifies a few of the openings 246). The plurality of openings 246 may be organized in one or more patterns on the anterior face 242 of the output shaft 226. For example, a pattern may be a circular configuration with twelve openings 246 spaced 30 degrees apart. Another pattern may be a circular configuration with eight openings 246 spaced 45 degrees apart. In some embodiments, the plurality of openings 246 may be identical. Alternatively, the plurality of openings 246 may be distinguished by two sets of openings. For example, one set of openings may define a first pattern and a second set of openings may define a second pattern. The plurality of openings 246 may be configured to mount the servo actuator 200 to another device. The plurality of openings 246 may define threaded cavities. The plurality of openings 246 may be radially positioned from the central axis of the output shaft 226. The radial position of the plurality of openings 246 may advantageously apply greater torque to a coupled device.

According to some embodiments, a transverse dimension of the output shaft 226 may be greater than a longitudinal dimension of the output shaft 226. For example, the diameter of the output shaft 226 may be greater than the thickness and/or length of the output shaft 226 extending in the X-X direction. In such embodiments, the width of the output shaft 226 may be greater than the length of the output shaft 226.

The base housing 202 may further comprise one or more bearings 248A, 248B and/or sets of bearings. The bearings 248A, 248B and/or sets of bearings may be configured to support the drive shaft 232. The one or more bearings 248A, 248B may be coaxially positioned along the longitudinal axis of the servo actuator 200. In some embodiments, a first bearing 248A may be larger than a second bearing 248B.

The upper housing 204 may be configured to power and control the electronics of the servo actuator 200. The controller 250 may be modular and separated into a first board 252 and a second board 254. The first board 252 may be positioned in parallel to the second board 254 in a stacked controller configuration. The first board 252 may be a servo driver power board. The second board 254 may be a servo driver controller board. In such embodiments, the servo driver power board may be mounted in parallel relative to the servo driver controller board within the second cavity of the housing. The stacked controller configuration may advantageously minimize the planar size of the controller. Accordingly, the servo actuator 200 may be minimized into a compact state. Alternatively, the upper housing 204 may comprise ports for connecting to an external power supply and controller as discussed in greater detail below regarding FIGS. 5A-5B. The upper housing 204 may further comprise a thermal sensor to monitor the temperature of the controller 250.

The first board 252 may be a servo driver power board. In some embodiments, the first board 252 may handle high electrical currents and provide electrical power to subcomponents of the servo actuator 200 including the sensor 212, the motor 222, and the second board 254. The second board 254 may be a servo driver controller board. In some embodiments, the second board 254 may comprise the logic for controlling the servo actuator 200. The second board 254 may comprise a CPU, a controller and/or microcontroller, and other control components. In some embodiments, the first board 252 and the second board 254 may have the same geometric shape. In some embodiments, the second board 254 may implement a closed loop ignition and velocity control on the motor. The second board 254 may comprise a firmware configured to tune and/or adjust inputs to the motors thereby advantageously providing reliable performance regardless of minute differences in manufacturing and/or performance of other components. The second board 254 may be configured to operate on 24 volts.

The controller 250 may comprise a plurality of pins for enabling electrical interconnectivity. Additionally, and/or alternatively, the controller 250 may comprise one or more busses. In some embodiments, the controller 250 may comprise a flight critical can bus for collecting data. In some embodiments, the controller 250 may comprise a secondary can bus. In some embodiments, noise comprising unnecessary data may be removed. The one or more can busses may evaluate the performance of the servo actuator 200 and/or detect anomalies and maintenance requirements. In some embodiments, the one or more can busses may receive temperature data from the motor 222.

The servo actuator 200 may further comprise an end cap 256. The end cap 256 may have an outer diameter less than an inner diameter of the rear face of the base housing 202 defined by the protruding portion of the rear face 203 extending in the anterior direction supporting the first bearing 248A. The end cap 256 may be slidably inserted within the cavity defined by the protruding portion of the rear face 203. The posterior surface of the end cap 256 may be co-planar with the rear face 203. The end cap 256 may be secured in place via a textured surface located on an anterior end of the end cap 256 configured to engage with a corresponding textured surface of the rear face 203. In some embodiments, the textured surface may be threading for screwing the end cap 256 into place.

The motor assembly 206 may be housed within the base housing 202. In some embodiments, the motor 222 may be located at a posterior position and the output shaft 226 may be located at an anterior position with the geartrain 224 positioned therebetween. The following description relates to the interconnectivity of the motor assembly 206 according to some advantageous embodiments.

The motor 222 may be located within the base housing 202 at a posterior position. The exterior surface of the stator 228 may be fixed to one or more of the interior surfaces of the base housing 202. In some embodiments, the stator 228 may be potted within the base housing 202. For example, the exterior surface of the stator 228 may be adhered to one or more of the interior surfaces of the base housing 202. The exterior surface of the stator 228 may be bonded to one or more of the interior surfaces of the base housing 202 via a high thermal conductivity glue. For example, via a one-part thermal epoxy. The stator 228 may surround the rotor 230. The high thermal conductivity glue may advantageously transfer heat from the motor 222 thereby increasing the efficiency of the motor by keeping the stator 228 cool.

The rotor 230 may surround the drive shaft 232. In some embodiments, the stator 228, the rotor 230, and the drive shaft 232 may be nested in a coaxial configuration where the drive shaft 232 is positioned within an interior cavity of the rotor 230, and the rotor 230 is positioned within an interior cavity of the stator 228. The rotor 230 may be magnetically coupled to the stator 228. The drive shaft 232 may be fixed to the interior surface of the rotor 230. In some embodiments, the drive shaft 232 may be adhered to the inner surface of the rotor 230. For example, the drive shaft 232 may be fixed to the rotor 230 via an adhesive. In some embodiments, the posterior end of the motor 222 may be secured to the rear face 203 of the base housing 202 by threading a fastener through the inner shaft of the first bearing 248A into a cavity defined by the drive shaft 232. The fastener may sandwich a support plate between the fastener head and the posterior end of the first bearing 248A.

The geartrain 224 may be located in an anterior direction relative to the motor 222 within the base housing 202. The geartrain 224 may be operatively coupled to the motor 222 and configured to use the output of the motor 222 as an input. In some embodiments, the drive shaft 232 of the motor 222 may engage with the central plug 238 of the geartrain 224. For example, the drive shaft 232 may extend through the opening defined by the central plug and engage with the interior of the central plug 238. In such embodiments, a rotation of the drive shaft 232 causes a corresponding movement of the central plug 238. A movement of the central plug 238, in turn, causes corresponding movements in the inner spline 236 and outer spline 234. The movement of the outer spline 234 may correspond to an output of the geartrain 224. In some embodiments, the geartrain 224 may be coaxial with the motor 222. Accordingly, the geartrain 224 may advantageously provide a coaxial output torque.

The output shaft 226 may be located in an anterior position relative to the geartrain 224 within the base housing 202. The output shaft 226 may be operatively coupled to the geartrain 224 and configured to use the output of the geartrain 224 as an input. In some embodiments, the outer spline 234 may engage with a posterior face 240 of the output shaft 226. For example, the outer spline 234 may comprise a shell extending in the anterior direction through which bolts may engage with the plurality of mounting surfaces 244. Accordingly, the output shaft 226 may be operatively coupled to the outer spline 234 such that a rotation of the outer spline 234 causes a corresponding rotation of the output shaft 226.

The first bearing 248A may be positioned around a posterior end of the drive shaft 232. In some embodiments, the first bearing 248A may be mounted to a portion of the rear face 203 of the base housing 202. The portion of the rear face 203 may be positioned interior of the base housing 202 and medial of an exterior wall of the posterior end of the drive shaft 232. An interior portion of the posterior end of the drive shaft 232 may be supported by the interior shaft of the first bearing 248A. A second bearing 248B may be positioned around an anterior end of the drive shaft 232. In some embodiments, the second bearing 248B may be mounted within the posterior face 240 of the output shaft 226. The anterior end of the drive shaft 232 may be supported by the interior shaft of the second bearing 248B.

The drive shaft 232 may extend through the geartrain 224 and into the posterior face 240 of the output shaft 226.

The cover 210 may be positioned at an anterior end of the base housing 202 between the output shaft 226 and the base housing 202.

The sensor 212 may be positioned at an anterior end of the base housing 202 located posterior to the second support ring 216. In some embodiments, the sensor 212 may be fixed to the posterior side of the second support ring 216. For example, the sensor 212 may be adhered to the posterior face of the second support ring 216. The sensor 212 may radially surround a portion of the motor assembly 206. In some embodiments, the sensor 212 may radially surround and measure the rotary movements of the output shaft 226. Additionally, and/or alternatively, the sensor 212 may radially surround and measure the rotary movements of the geartrain 224. The sensor 212 may be in electrical communication with the controller 250 through the opening 205.

The following description relates to the relationship between the first support ring 214, the second support ring 216, the bearing 218, and the spacer 220 in relation to base housing 202 and the motor assembly 206.

The first support ring 214 may be longitudinally positioned at an anterior position within the base housing 202 positioned posterior relative to the cover 210. The first support ring 214 may be positioned radially outward of the output shaft 226 and radially inward of the base housing 202. In some embodiments, the first support ring 214 may be threaded and screwed into place. For example, the first support ring 214 may thread with corresponding threads of the base housing 202. The first support ring 214 may securely hold the bearing 218 and/or output shaft 226. In some embodiments, the first support ring 214 may contact the inner surface of the base housing 202 and the outer surface of the output shaft 226 simultaneously. In some embodiments, the first support ring 214 does not contact the outer surface of the output shaft 226. For example, a gap may exist between the inner surface of the first support ring 214 and the outer surface of the output shaft 226. In some embodiments, the point of contact between the first support ring 214 and the inner surface of the base housing 202 may be a faying surface. The faying surface between the base housing 202 and the first support ring 214 may be formed of an electro-conductive material. In some embodiments, the faying surface between the base housing 202 and the first support ring 214 may not be anodized. In such embodiments, the faying surface may be continuously conductive. The electro-conductive material at the faying surface may advantageously provide EMI shielding to limit EMI from being emitted through the front face of the base housing 202.

The second support ring 216 may be positioned at an anterior position within the base housing 202 positioned posterior relative to the first support ring 214. The second support ring 216 may be positioned radially outward of the output shaft 226 and radially inward of the base housing 202. In some embodiments, the second support ring 216 may be threaded and screwed into place. For example, the second support ring 216 may thread with corresponding threads of the output shaft 226. The second support ring 216 may securely hold the bearing 218 and/or output shaft 226. In some embodiments, the second support ring 216 may contact the inner surface of the base housing 202 and the outer surface of the output shaft 226 simultaneously.

The bearing 218 may be longitudinally positioned at an anterior position within the base housing 202 between the first support ring 214 and the second support ring 216. The bearing 218 may be positioned radially outward of the output shaft 226 and radially inward of the base housing 202. In some embodiments, the bearing 218 may contact the inner surface of the base housing 202 and the outer surface of the output shaft 226 simultaneously. In some embodiments, a gap may exist between the outer surface of the bearing 218 and the inner surface of the base housing 202.

The gap filler and/or sealing ring 219 may be longitudinally positioned at an anterior position within the base housing 202. The gap filler and/or sealing ring 219 may be longitudinally aligned with the first support ring 214. The gap filler and/or sealing ring 219 may be radially positioned between the first support ring 214 and the output shaft 226.

The spacer 220 may be positioned at an anterior position within the base housing 202 and between the bearing 218 and the base housing 202. In some embodiments, the spacer 220 may extend the bearing 218 to provide a contact surface between the bearing 218 and the base housing 202. In some embodiments, the spacer 220 may extend the base housing 202 to provide a contact surface between the bearing 218 and the base housing 202.

The following description relates to the upper housing 204.

The first board 252 may be in electrical communication with the second board 254. The second board 254 comprising the CPU, controller and/or microcontroller, and control circuits may direct power from the first board 252 to the electronics of the servo actuator 200 including but not limited to the motor 222, the sensor 212, and the thermal sensors. For example, power may be directed to hall effect sensors within the sensor 212, conductors coming from the motor 222, and the thermal sensor for monitoring the temperature of the motor 222. In some embodiments, the first board 252 may be positioned within the upper housing 204 anterior to the second board 254. The controller 250 may be in further electrical communication with the connector 208.

The connector 208 may be in electrical communication with other electronics exterior to the servo actuator 200. The connector 208 may facilitate communication between the servo actuator 200 and other electronic devices including controllers and computers. In some embodiments, the connector 208 may connect the servo actuator 200 to a master controller of a vehicle. For example, the connector 208 may connect the servo actuator 200 to a controller of an unmanned aerial vehicle (UAV).

Figure 3:
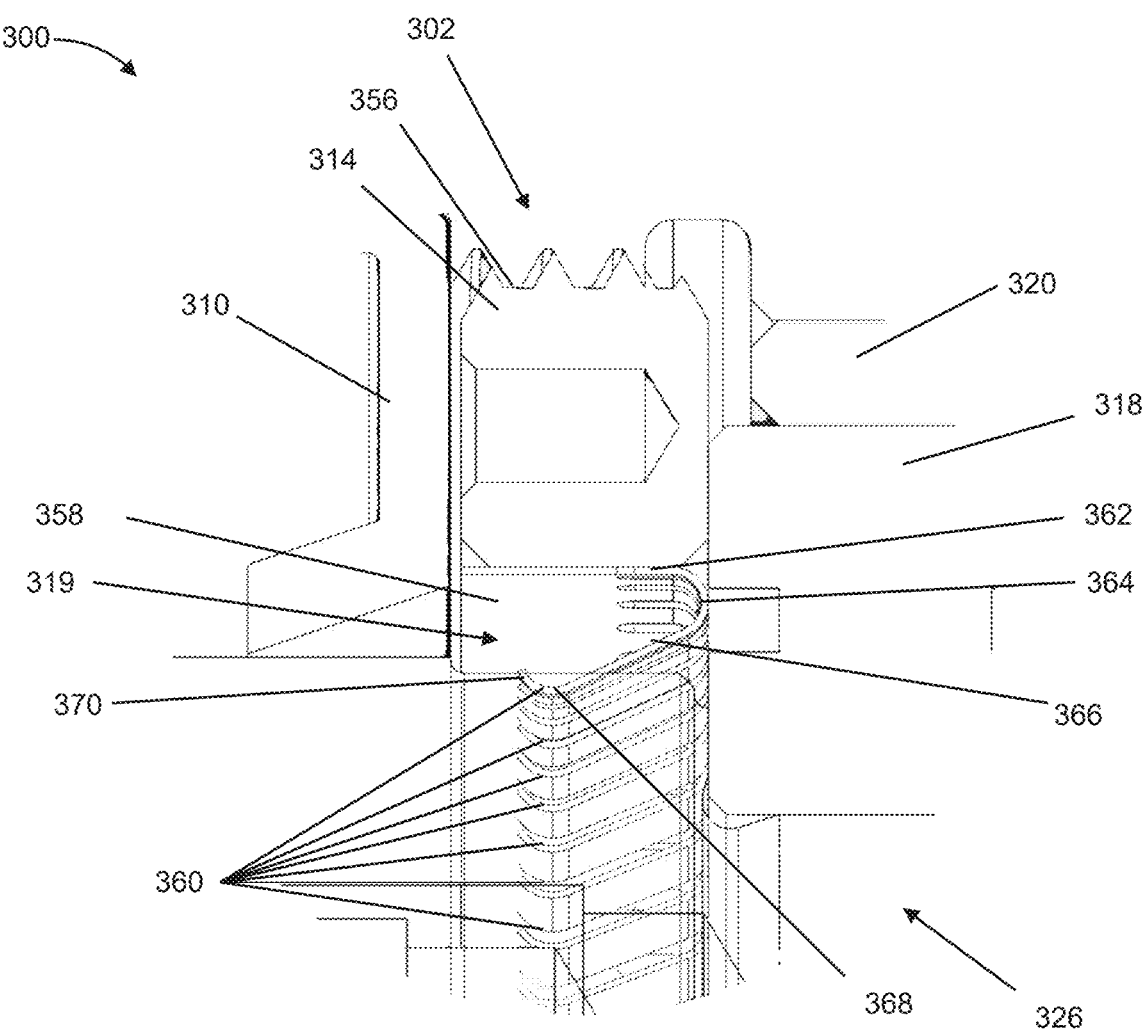
FIG. 3 is a perspective view of a dynamic electromagnetic interference seal.

FIG. 3 shows a close-up cross-sectional view of a servo actuator 300. The servo actuator 300 may comprise a base housing with base housing 302, a cover 310, a first support ring 314, a bearing 318, a gap filler and/or sealing ring 319, a spacer 320, an output shaft 326, and a faying surface 356 between the base housing 302 and the first support ring 314. The servo actuator 300 may be the same as the servo actuator 200 described above such that the base housing 302, the cover 310, the first support ring 314, bearing 318, gap filler and/or sealing ring 319, the spacer 320, and the output shaft 326 may be the base housing 202, the cover 210, the first support ring 214, the bearing 218, the gap filler and/or sealing ring 219, the spacer 220, and the output shaft 226, respectively. FIG. 3 illustrates a transparent output shaft 326 for better visualization of the gap filler and/or sealing ring 319.

As described above, the gap filler and/or sealing ring 319 may comprise a body 358 having a plurality of finger springs 360. The finger springs 360 may be equally spaced around the circumference of the gap filler and/or sealing ring 319. In some embodiments, the finger springs 360 may be spaced between 0.5 mm and 1.5 mm. For example, each of the finger springs 360 may be spaced about 1 mm from adjacent finger springs 360. The finger springs 360 may be flexible having a modulus of elasticity allowing the finger springs 360 to bend and return to their original deflection point.

According to some embodiments, the finger springs 360 may each further comprise, a first portion 362, a first curve 364, a second portion 366, a second curve 368, and a third portion 370. The body 358 may form a ring defining the circumference of the gap filler and/or sealing ring 319. Each of the first portion 362, the first curve 364, the second portion 366, the second curve 368, and the third portion 370 comprise a first end and a second end. In some embodiments, the first portion 362, the second portion 366, and the third portion 370 may each comprise a longitudinal axis extending between their respective first end and second end. In some embodiments, the first curve 364 and the second curve 368 may each comprise two or more longitudinal axes wherein at least the first and second ends have differing longitudinal axes. In some embodiments, the first curve 364 and the second curve 368 may be more elastic and/or flexible than the first portion 362, the second portion 366, and/or the third portion 370.

The portions and curves may be alternately positioned. In some embodiments, the curves may be positioned between two portions. For example, the first curve 364 may be positioned between the first portion 362 and the second portion 366 while the second curve 368 may be positioned between the second portion 366 and the third portion 370. The first portion 362 may be coupled to and extend axially from the body 358. The first end of the first curve 364 may extend from the second end of the first portion 362. The first end of the second portion 366 may extend from the second end of the first curve 364. The first end of the second curve 368 may extend from the second end of the second portion 366. The first end of the third portion 370 may extend from the second end of the second curve 368. In some embodiments, the first curve 364 and second curve 368 may define a curvature wherein the second end may have a different longitudinal axis than the longitudinal axis of the first end, respectively.

The finger springs 360 may be configured to bend about the first curve 364 in response to a force. A bend about the first curve 364 may shorten the distance between the third portion 370 and the first portion 362 and corresponding thickness of the gap filler and/or sealing ring 319.

The finger springs 360 may provide EMI shielding. In some embodiments, the finger springs 360 may be formed of a conductive material. For example, the finger springs 360 may be formed of beryllium-copper.

The gap filler and/or sealing ring 319 may be radially positioned between the output shaft 326 and the base housing 302. The output shaft 326 may be the same as the output shaft 138 and/or the output shaft 226. The gap filler and/or sealing ring 319 may fill a gap between the output shaft 326 and the base housing 302. In some embodiments, the gap filler and/or sealing ring 319 may be radially positioned between the output shaft 326 and the first support ring 314 or first retainer. The first support ring 314 may be the same first support ring 214. The gap filler and/or sealing ring 319 may be fixed in place. In some embodiments, the gap filler and/or sealing ring 319 may be adhered in place between the output shaft 326 and the base housing 302. For example, the gap filler and/or sealing ring 319 may be epoxied in place. The epoxy may be an electroconductive material.

The bendable finger springs 360 may advantageously provide for an adjustable electroconductive EMI shielding to be inserted and fill gaps between the rotatable output shaft 326 and the exterior base housing 302. Additionally, the gap filler and/or sealing ring 319 may provide additional EMI shielding to prevent EMI from being emitted through the front face of the base housing 302. Furthermore, the epoxy may provide additional EMI shielding. Thus, the gap filler and/or sealing ring 319 may provide an adjustable EMI shielding between rotatable shafts and a stationary body.

Figure 4:
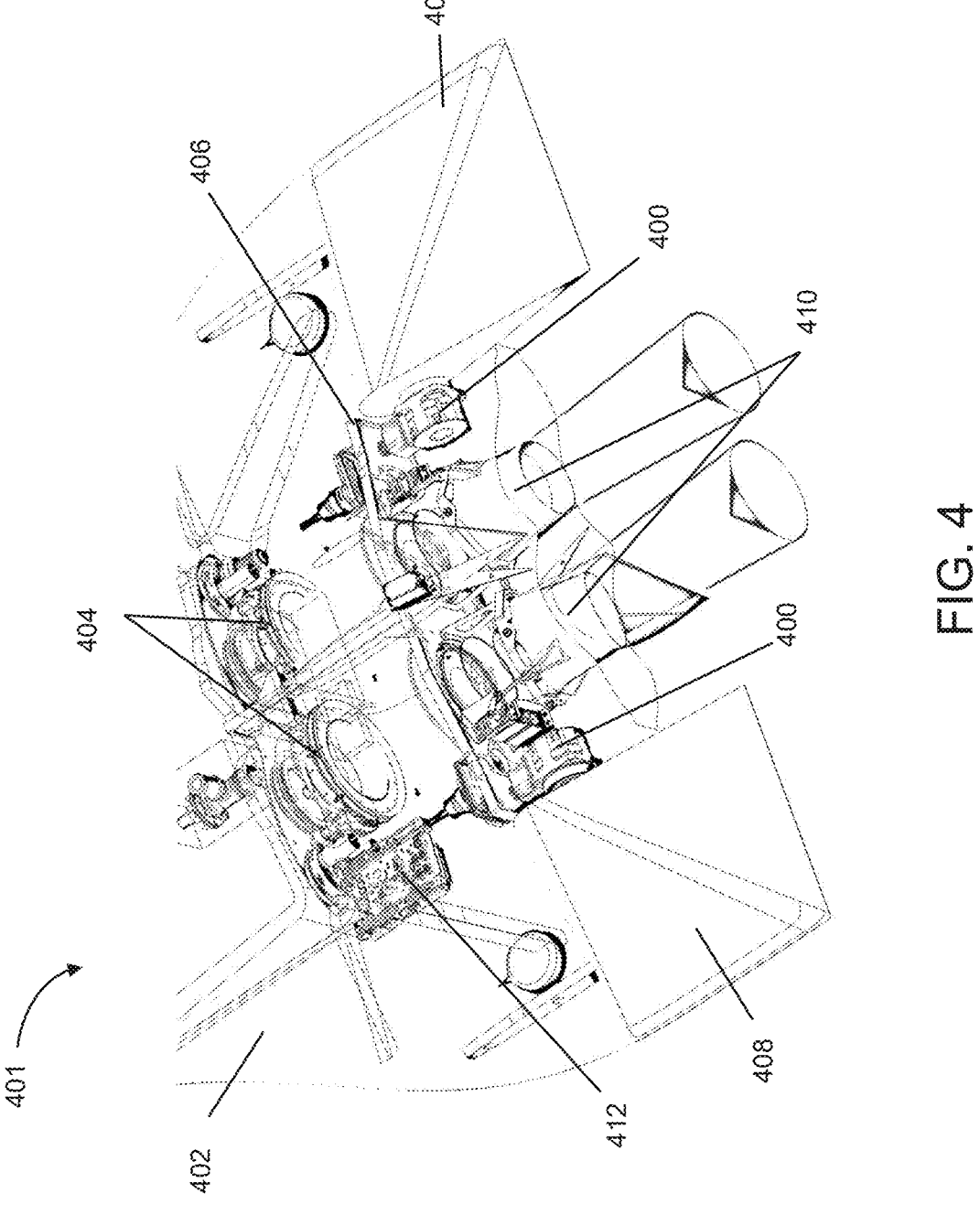
FIG. 4 is a perspective view of a portion of an aircraft having the servo actuator of FIG. 1.

FIG. 4 illustrates a perspective view of a UAV 401 comprising a plurality of servo actuators 400, a body 402, one or more jet engines and/or thrust generators 404, a frame 406, a plurality of elevons 408, one or more thrust deflectors and/or thrust vector control nozzles 410, and a central computer 412.

The plurality of servo actuators 400 may be the servo actuators 100, 200, or 300 described above. The UAV 401 may comprise the same number of servo actuators 400 as the number of elevons 408. In some embodiments, the elevons 408 may be actuated by the servo actuators 400. The compact configuration of the servo actuator 400 optimizes size and mass with power output for use with a UAV 401. The stacked controller configuration within the upper housing of the servo actuator 400 may advantageously save space within the body 402 of the UAV 401 otherwise reserved for the controllers.

Each of the plurality of servo actuators 400 may have a rotational range. In some embodiments, each of the plurality of servo actuators 400 may have a rotational range between-90 and +90 degrees. The rotational range may advantageously provide a full range of motion to the servo actuators 400 for providing a controllable flight path to the UAV 401.

Each of the plurality of servo actuators 400 may track an absolute position of its motor assembly. In some embodiments, each of the plurality of servo actuators 400 may track the absolute position of the output shaft. In some embodiments, each of the plurality of servo actuators 400 may have an absolute position saved in memory at startup. The saved absolute position of the servo actuators 400 may advantageously track the position of the elevons 408 and eliminate the need to "zero" or initialize the servo actuators 400 during UAV startup.

Each of the plurality of servo actuators 400 may have a rotational velocity exceeding 160 degrees per second (deg/s). In some embodiments, each of the plurality of servo actuators 400 may achieve this rotational velocity for at least five seconds. In some embodiments, each of the plurality of servo actuators 400 may achieve this rotational velocity under about 14 Newton-meters (Nm) of applied torque. The rotational velocity of the servo actuators 400 may advantageously provide near instantaneous and controlled maneuvering of the UAV 401 by quickly actuating the elevons 408 in position.

Each of the plurality of servo actuators 400 may have a rotational acceleration exceeding 15,000 degrees per second squared (deg/s$^2$). In some embodiments, each of the plurality of servo actuators 400 may achieve this rotational acceleration for at least five seconds. In some embodiments, each of the plurality of servo actuators 400 may achieve this rotational acceleration under about 14 Nm of applied torque. The rotational acceleration of the servo actuators 400 may advantageously provide near instantaneous and controlled maneuvering of the UAV 401 by quickly actuating the elevons 408 in position.

Each of the plurality of servo actuators 400 may have a minimum operational time of at least 25 minutes. In some embodiments, each of the plurality of servo actuators 400 may have an operational time of at least twenty-five minutes while undergoing at least a rotational acceleration of 2000 deg/s$^2$ and an RMS acceleration of 400 deg/s$^2$. In some embodiments, each of the plurality of servo actuators 400 may experience these accelerations under an applied torque up to about 4 Nm. In some embodiments, the applied torque may be measured at the output shaft of each of the servo actuators 400. The minimum operational time of twenty-five minutes may advantageously provide continuous operation of the UAV 401 under operating conditions.

Each of the plurality of servo actuators 400 may have a resolution of at least 0.002 degrees. In some embodiments, the output shaft of each of the plurality of servo actuators 400 may be measured. In some embodiments, each of the plurality of servo actuators 400 may comprise an 18-bit encoder. The resolution may advantageously provide accurate and precise movement and control of the elevons.

Each of the plurality of servo actuators 400 may comprise the above-listed features and perform the above-listed functionalities while loaded with a load inertia of 7.9 g/m². In some embodiments, the load inertia may be measured along the output shaft of each of the servo actuators 400.

Each of the plurality of servo actuators 400 may comprise the above-listed features and perform the above-listed functionalities under at least about a 33 Nm principal bending moment about a vector normal to the output shaft axis and 20 Nm torque applied about the output shaft axis.

Each of the plurality of servo actuators 400 may comprise backdrivable motors. In some embodiments, each of the plurality of servo actuators 400 may be backdrivable when powered. In some embodiments, each of the plurality of servo actuators 400 may be backdrivable when not powered. The backdrivability of each of the servo actuators 400 may advantageously allow for external inputs applied to the output shaft of the servo actuators 400.

Each of the plurality of servo actuators 400 may have a strain wave geartrain having minimal clearance. In some embodiments. In some embodiments, the strain wave geartrain has a maximum backlash of less than about 0.5 degrees. In some embodiments, the strain wave geartrain has a maximum backlash of less than about 0.2 degrees. In some embodiments, the strain wave geartrain has a maximum backlash of less than about 0.13 degrees. The minimal backlash may advantageously provide stiffness to each of the plurality of servo actuators 400.

Each of the plurality of servo actuators 400 may have a mass less than about 600 grams (g). In some embodiments, each of the plurality of servo actuators 400 may be less than 510 g. The lightweight servo actuators 400 may advantageously reduce mass of the UAV 401 thereby allowing for additional gear, maneuverability, and/or fuel consumption/flight time.

The body 402 may be an outer shell of the UAV 401. The body 402 may comprise fixed wings. In some embodiments, the body 402 may be a delta configuration wherein the body 402 may resemble a triangle. For example, the body 402 may have a pointed forward end and a wide aft end.

The one or more thrust generators 404 may be one or more engines. In some embodiments, the one or more thrust generators 404 may generate and emit pressurized gas to provide thrust. For example, the one or more thrust generators 404 may be jet engines.

The frame 406 may be an aft plate comprising a plurality of mounting surfaces. The frame 406 may further define a plurality of openings. In some embodiments, the plurality of openings may be access openings and/or propulsion openings. The access openings may be configured for objects to pass through the frame. In some embodiments, electrical wiring may extend through the plurality of openings. In some embodiments, the propulsion openings may be configured for pressurized exhaust to be emitted from the UAV.

The plurality of elevons 408 may be a movable part at the aft end and/or trailing edge of the UAV 401. The plurality of elevons 408 may be control surfaces for controlling pitch and/or roll of the UAV 401. The plurality of elevons 408 may comprise an axis of rotation about which the UAV 401 may rotate. In some embodiments, the axis of rotation may be orthogonal to the longitudinal axis of the UAV 401. The plurality of elevons 408 may comprise a mounting surface. The mounting surface of the plurality of elevons 408 may comprise a pattern. In some embodiments, the pattern of the mounting surface of the elevons 408 may correspond to the pattern of the plurality of openings of the anterior face of the output shaft of the servo actuators 400. In some embodiments, the mounting surfaces of the plurality of elevons 408 define the axis of rotation of the plurality of elevons 408. The elevons may be stiff and directly coupled to the servo actuator 400 to minimize flexibility of the UAV 401.

The one or more thrust vector control nozzles 410 may be nozzles and/or funnel shaped components configured and adapted to redirect and/or control emitted pressurized exhaust. The one or more control nozzles 410 may comprise a plurality of linkages and/or servos actuators in a system adapted and configured to manipulate the orientation of the one or more control nozzles 410. Redirecting the exhaust may provide directional control of the UAV 401.

The central computer 412 of the UAV 401 may be a high-level system controller for the UAV 401. The central computer 412 may receive inputs from subsystems of the UAV 401 and remote systems and transmit outputs to subsystems of the UAV 401 and remote systems.

The body 402 may house the one or more thrust generators 404, the frame 406, and the central computer 412. The one or more thrust generators 404 may be centrally positioned and longitudinally aligned with the UAV 401 within the body 402. The one or more thrust generators 404 may emit pressurized exhaust through the aft end of the UAV 401. The frame 406 may be positioned at the aft end of the UAV 401, defining an exterior boundary. One or more propulsion openings of the plurality of openings of the frame 406 may be longitudinally aligned with the one or more thrust generators 404 such that the exhaust of the one or more thrust generators 404 is emitted through the one or more openings of the frame 406. The central computer 412 may be located at a position within the body. In some embodiments, the central computer 412 may be positioned near the aft end of the UAV 401 and laterally from the one or more thrust generators 404.

The plurality of elevons 408 may be operatively coupled to a corresponding one of the plurality of servo actuators 400. In some embodiments, the plurality of elevons 408 may be directly coupled to a corresponding one of the plurality of servo actuators 400. For example, the mounting surfaces of the plurality of elevons 408 may engage directly with the anterior faces of the output shafts of the plurality of servo actuators 400. In some embodiments, the mounting surfaces of the plurality of elevons 408 are positioned along a longitudinal side of the plurality of elevons 408. Accordingly, an actuation of the plurality of servo actuators 400 may result in a rotation of the corresponding plurality of elevons 408 about their respective axis of rotation.

The plurality of servo actuators 400 may be mounted to the frame 406. In some embodiments, the plurality of servo actuators 400 extend longitudinally from the frame 406 exterior of the body 402. The output shafts of the plurality of servo actuators 400 may be oriented away from the longitudinal axis facing a lateral direction. The connector of the plurality of servo actuators 400 may extend through the one or more access openings of the plurality of openings of the frame 406. The plurality of servo actuators 400 may be electrically connected to the central computer 412 of the UAV 401 and configured to send and receive electrical signals therebetween.

Figure 5A:
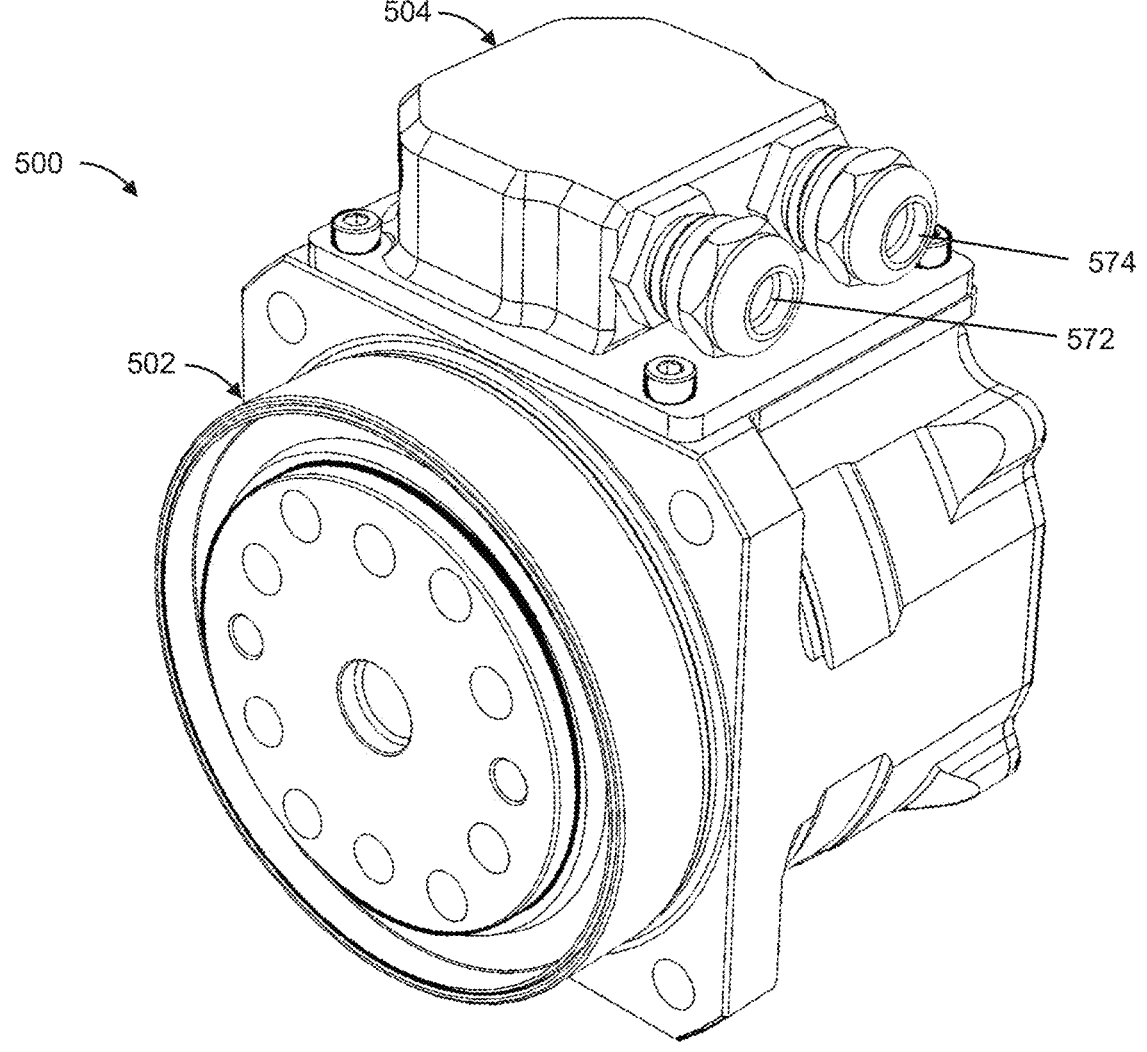
FIG. 5A is a perspective view of an embodiment of a servo actuator.
Figure 5B:
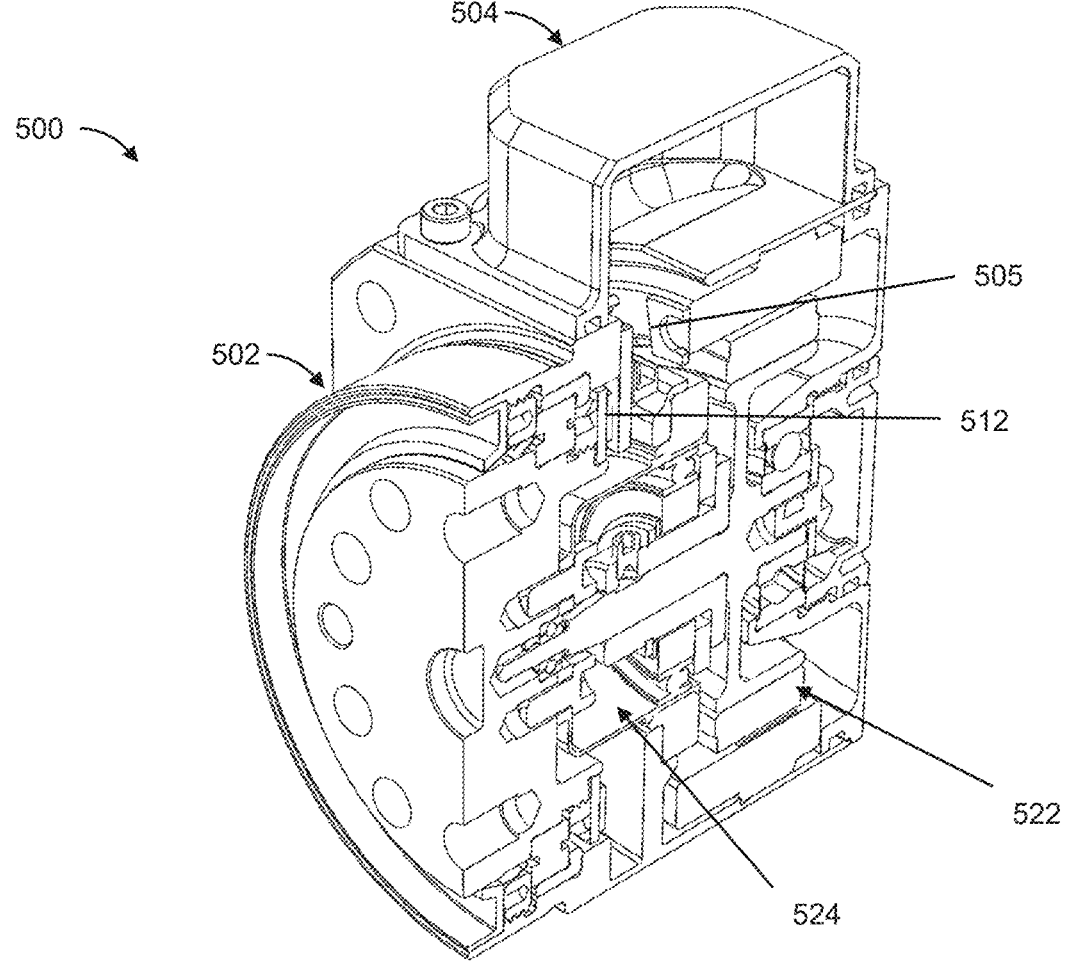
FIG. 5B is a cross-sectional perspective view of the servo actuator of FIG. 5A.

FIGS. 5A and 5B illustrate an alternative embodiment of a servo actuator 500. The servo actuator 500 may comprise a base housing 502 and an upper housing 504. In some embodiments, the base housing 502 may be the same as the base housing 202. The upper housing 504 may comprise one or more ports for connecting the servo actuator 500 to an external controller. In some embodiments, the upper housing 504 may comprise a first port 572 and a second port 574 for connecting to a controller and power supply respectively. For example, the first port 572 may be configured to electrically connect the servo actuator 500 to an external controller while the second port 574 may be configured to electrically connect the servo actuator 500 to an external power supply. As shown in FIG. 5B, wires, cables and/or other devices used to transfer electrical signals and/or power may extend from the first and second ports 572, 574 through an opening 505 into the cavity of the base housing 502.

In some embodiments, the motor 522 of the servo actuator 500 may be a brushless DC motor configured to provide torque to a gear train 524 such as a strain wave geartrain. In some embodiments, one or more sensors 512 such as an encoder ring may be a magnetic encoder including hall effect sensors for providing position feedback to the external controller.

Additional Disclosures

Example implementations of the present disclosure include disclosures presented in the provisional patent applications incorporated by reference herein. These applications disclose additional figures, implementations, features and/or aspects of devices, systems, and methods related to aircraft systems that form parts or portions of the present disclosure, including, without limitation, disclosure that supports claims and/or clauses of the present application and/or related applications, which disclosure can be relied upon and/or bodily incorporated, in whole or in part, and presented herein in its entirety for all purposes and for all that it contains. Furthermore, additional inventive combinations of features are disclosed herein and example implementations can be combined with any one or more features, aspects, and/or implementations of the present disclosure.

U.S. Provisional Patent Application No. 63/516,795, filed Jul. 31, 2023, entitled "SERVO ACTUATOR WITH ELECTROMAGNETIC INTERFERENCE SHIELDING," which is hereby incorporated by reference herein in its entirety for all purposes and for all that it contains, discloses additional figures, implementations, features and/or aspects of devices, systems, and methods related to aircraft systems, including, but not limited to, compact jet-powered unmanned aircraft for vertical takeoff and landing with autonomous navigation, detection, tracking, graphical user interfaces, and related systems and methods, that supports claims and/or clauses of the present application and/or related applications, which disclosure can be relied upon and/or bodily incorporated, in whole or in part, and presented herein in its entirety for all purposes and for all that it contains

EXAMPLE CLAUSES

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A servo actuator comprising: a housing having a plurality of exterior surfaces defining a cavity, one of the plurality of exterior surfaces defining an opening, the opening having an interior surface extending into the cavity of the housing in a direction orthogonal to the one of the plurality of exterior surfaces; a motor mounted within the cavity of the housing, the motor having a drive shaft; a geartrain operatively coupled to the drive shaft, the geartrain having an output shaft positioned in the opening of the housing; a sensor configured to monitor the position of the output shaft; one or more control boards electrically connected to the motor and the sensor; and a sealing ring positioned between the output shaft and the interior surface of the opening, wherein the sealing ring comprises an electrically conductive material and is configured and positioned to fill a gap between the output shaft and the interior surface of the opening.

Clause 2: The servo actuator of clause 1, further comprising a cross roller bearing operatively coupling the output shaft and the interior surface of the opening.

Clause 3: The servo actuator of clause 1 or clause 2, wherein a width of the output shaft of the geartrain is greater than a length of the output shaft of the geartrain.

Clause 4: The servo actuator of any of clauses 1 to 3, wherein the sensor is an encoder.

Clause 5: The servo actuator of any of clauses 1 to 4, wherein the drive shaft and the output shaft are coaxial.

Clause 6: The servo actuator of any of clauses 1 to 5, wherein the geartrain is a strain wave drive.

Clause 7: The servo actuator of any of clauses 1 to 6, wherein sealing ring is a ring comprising at least one spring.

Clause 8: The servo actuator of any of clauses 1 to 7, wherein the sealing ring is radially flexible.

Clause 9: The servo actuator of any of clauses 1 to 8, wherein the sealing ring comprises a plurality of finger springs.

Clause 10: The servo actuator of any of clauses 1 to 9, wherein a plurality of finger springs are made of beryllium copper.

Clause 11: The servo actuator of any of clauses 1 to 10, wherein the sealing ring is secured between the output shaft and the interior surface of the opening with electroconductive epoxy.

Clause 12: The servo actuator of any of clauses 1 to 11, wherein the sealing ring is configured to provide shielding from electromagnetic interference.

Clause 13: The servo actuator of any of clauses 1 to 12, wherein the housing is formed of electrically conductive material.

Clause 14: The servo actuator of any of clauses 1 to 13, wherein the housing comprises aluminum.

Clause 15: A servo actuator comprising: a housing having a plurality of exterior surfaces defining a first cavity and a second cavity, at least one of the plurality of exterior surfaces defining an opening, the opening having an interior surface extending into the first cavity of the housing in a direction orthogonal to the one of the plurality of exterior surfaces; a motor mounted within the first cavity of the housing, the motor having a drive shaft; a strain wave drive mounted within the first cavity of the housing and operatively coupled to the drive shaft at an anterior end, the strain wave drive having an output shaft positioned within the opening of the housing; a sensor mounted within the first cavity of the housing and configured to monitor an angular position of the output shaft; a servo driver controller board mounted within the second cavity of the housing and electrically connected to the motor and the sensor; a servo driver power board mounted in parallel relative to the servo driver controller board within the second cavity of the housing and electrically connected to the servo drive controller board; and a sealing ring positioned between the output shaft and the interior surface of the opening; wherein the sealing ring is formed of an electrically conductive material.

Clause 16: The servo actuator of clause 15, further comprising a cross roller bearing operatively coupling the output shaft and the interior surface of the opening.

Clause 17: The servo actuator of clause 15 or clause 16, wherein a width of the output shaft of the strain wave drive is greater than a length of the output shaft of the strain wave drive.

Clause 18: The servo actuator of any of clauses 15 to 17, wherein a posterior face of the output shaft is coplanar with a face of the housing.

Clause 19: The servo actuator of any of clauses 15 to 18, wherein the drive shaft and the output shaft are coaxial.

Clause 20: The servo actuator of any of clauses 15 to 19, wherein the sensor is an encoder ring positioned at the anterior end of the strain wave drive.

Clause 21: The servo actuator of any of clauses 15 to 20, wherein the servo actuator has a rotational range from −90 degrees to +90 degrees.

Clause 22: The servo actuator of any of clauses 15 to 21, wherein the servo actuator tracks an absolute position of the output shaft without a need to initialize the servo actuator during use.

Clause 23: The servo actuator of any of clauses 15 to 22, wherein the servo actuator has a max rotational velocity of more than 160 degrees per second during use.

Clause 24: The servo actuator of any of clauses 15 to 23, wherein the servo actuator has a max rotational velocity of more than 160 degrees per second that is maintainable for at least five seconds during use.

Clause 25: The servo actuator of any of clauses 15 to 24, wherein the servo actuator has a max rotational velocity of more than 160 degrees per second that is maintainable for at least five seconds under a load of at least 14 Newton-meters of applied torque during use.

Clause 26: The servo actuator of any of clauses 15 to 25, wherein the servo actuator has a rotational acceleration of more than 15,000 degrees per second squared that is maintainable for at least five seconds under a load of at least 14 Newton-meters of applied torque during use.

Clause 27: The servo actuator of any of clauses 15 to 26, wherein the servo actuator has a rotational acceleration of at least 2,000 degrees per second squared and an RMS acceleration of at least 400 degrees per second squared that is maintainable for an operational time of at least twenty-five minutes under a load of up to 4 Newton-meters or more of applied torque during use.

Clause 28: The servo actuator of any of clauses 15 to 27, wherein the servo actuator has a rotational acceleration of at least 2,000 degrees per second squared and an RMS acceleration of at least 400 degrees per second squared that is maintainable for an operational time of at least twenty-five minutes under a load of up to 14 Newton-meters or more of applied torque during use.

Clause 29: The servo actuator of any of clauses 15 to 28, wherein the servo actuator has a rotational acceleration of at least 2,000 degrees per second squared and an RMS acceleration of at least 400 degrees per second squared that is maintainable for an operational time of at least twenty-five minutes under a load of up to 20 Newton-meters or more of applied torque during use.

Clause 30: The servo actuator of any of clauses 15 to 29, wherein the servo actuator has a rotational acceleration of at least 2,000 degrees per second squared and an RMS acceleration of at least 400 degrees per second squared that is maintainable for an operational time of at least twenty-five minutes under a load of up to 33 Newton-meters or more of applied torque during use.

Clause 31: The servo actuator of any of clauses 15 to 30, wherein the servo actuator comprises a backdrivable motor.

Clause 32: The servo actuator of any of clauses 15 to 31, wherein the servo actuator comprises a strain wave geartrain with maximum backlash of less than about 0.2 degrees.

Clause 33: The servo actuator of any of clauses 15 to 32, wherein the servo actuator has a mass less than about 600 grams.

Clause 34. A servo actuator comprising: a housing having a plurality of exterior surfaces defining a cavity, one of the plurality of exterior surfaces defining an opening, the opening having an interior surface extending into the cavity of the housing in a direction orthogonal to the one of the plurality of exterior surfaces; a motor mounted within the cavity of the housing, the motor having a drive shaft; a geartrain operatively coupled to the drive shaft, the geartrain having an output shaft positioned in the opening of the housing; a sensor configured to monitor a position of the output shaft; one or more control boards electrically connected to the motor and the sensor; and a sealing ring positioned between the output shaft and the interior surface of the opening, wherein the sealing ring comprises an electrically conductive material and is configured and positioned to fill a gap between the output shaft and the interior surface of the opening.

Clause 35. The servo actuator of clause 34, further comprising a cross roller bearing operatively coupling the output shaft and the interior surface of the opening.

Clause 36. The servo actuator of clause 34, wherein sealing ring is a ring comprising at least one spring.

Clause 37. The servo actuator of clause 34, wherein the sealing ring is radially flexible.

Clause 38. The servo actuator of clause 34, wherein the sealing ring comprises a plurality of finger springs.

Clause 39. The servo actuator of clause 38, wherein the plurality of finger springs are made of beryllium copper.

Clause 40. The servo actuator of clause 34, wherein the sealing ring is secured between the output shaft and the interior surface of the opening with electroconductive epoxy.

Clause 41. The servo actuator of clause 34, wherein the sealing ring is configured to provide shielding from electromagnetic interference.

Clause 42. The servo actuator of clause 34, wherein the housing is formed of electrically conductive material, wherein the housing comprises aluminum, wherein the sensor is an encoder, wherein a width of the output shaft of the geartrain is greater than a length of the output shaft of the geartrain, wherein the drive shaft and the output shaft are coaxial, and wherein the geartrain is a strain wave drive.

Clause 43. A servo actuator comprising: a housing having a plurality of exterior surfaces defining a first cavity and a second cavity, at least one of the plurality of exterior surfaces defining an opening, the opening having an interior surface extending into the first cavity of the housing in a direction orthogonal to the one of the plurality of exterior surfaces; a motor mounted within the first cavity of the housing, the motor having a drive shaft; a strain wave drive mounted within the first cavity of the housing and operatively coupled to the drive shaft at an anterior end, the strain wave drive having an output shaft positioned within the opening of the housing; a sensor mounted within the first cavity of the housing and configured to monitor an angular position of the output shaft; a servo driver controller board mounted within the second cavity of the housing and electrically connected to the motor and the sensor; a servo driver power board mounted in parallel relative to the servo driver controller board within the second cavity of the housing and electrically connected to the servo driver controller board; and a sealing ring positioned between the output shaft and the interior surface of the opening; wherein the sealing ring is formed of an electrically conductive material.

Clause 44. The servo actuator of clause 43, further comprising a cross roller bearing operatively coupling the output shaft and the interior surface of the opening.

Clause 45. The servo actuator of clause 43, wherein a width of the output shaft of the strain wave drive is greater than a length of the output shaft of the strain wave drive.

Clause 46. The servo actuator of clause 43, wherein a posterior face of the output shaft is coplanar with a face of the housing.

Clause 47. The servo actuator of clause 43, wherein the drive shaft and the output shaft are coaxial.

Clause 48. The servo actuator of clause 43, wherein the sensor is an encoder ring positioned at the anterior end of the strain wave drive.

Clause 49. The servo actuator of clause 43, wherein the servo actuator has a rotational range from −90 degrees to +90 degrees.

Clause 50. The servo actuator of clause 43, wherein the servo actuator has a max rotational velocity of more than 160 degrees per second during use.

Clause 51. The servo actuator of clause 43, wherein the servo actuator has a rotational acceleration of at least 2,000 degrees per second squared and an RMS acceleration of at least 400 degrees per second squared that is maintainable for an operational time of at least twenty-five minutes under a load of up to 33 Newton-meters or more of applied torque during use.

Clause 52. A servo actuator comprising: a housing having a plurality of exterior surfaces defining a cavity, at least one of the plurality of exterior surfaces defining an opening; a motor mounted within the cavity of the housing, the motor having a drive shaft; an output shaft operatively coupled to the drive shaft and positioned within the opening of the housing; and a sealing ring positioned between the output shaft and the interior surface of the opening; wherein the housing and the sealing ring are formed of an electrically conductive material.

Clause 53. The servo actuator of clause 52, wherein the sealing ring is secured between the output shaft and the housing with electroconductive epoxy.

Further Additional Disclosures

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the embodiments disclosed herein. Consequently, it is not intended that this disclosure be limited to the specific embodiments disclosed herein, but that it covers all modifications and alternatives coming within the true scope and spirit of the disclosure as embodied in the attached claims.

What is claimed is:

1. A servo actuator comprising:
a housing having a plurality of exterior surfaces defining a cavity, one of the plurality of exterior surfaces defining an opening, the opening having an interior surface extending into the cavity of the housing in a direction orthogonal to the one of the plurality of exterior surfaces;
a motor mounted within the cavity of the housing, the motor having a drive shaft;
a geartrain operatively coupled to the drive shaft, the geartrain having an output shaft positioned in the opening of the housing;
a sensor configured to monitor a position of the output shaft;
one or more control boards electrically connected to the motor and the sensor; and
a sealing ring positioned between the output shaft and the interior surface of the opening, wherein the sealing ring comprises an electrically conductive material and is configured and positioned to fill a gap between the output shaft and the interior surface of the opening, and wherein the sealing ring is configured to provide shielding from electromagnetic interference.

2. The servo actuator of claim 1, further comprising a cross roller bearing operatively coupling the output shaft and the interior surface of the opening.

3. The servo actuator of claim 1, wherein the sealing ring is a ring comprising at least one spring.

4. The servo actuator of claim 1, wherein the sealing ring is radially flexible.

5. The servo actuator of claim 1, wherein the sealing ring comprises a plurality of finger springs.

6. The servo actuator of claim 5, wherein the plurality of finger springs are made of beryllium copper.

7. The servo actuator of claim 1, wherein the sealing ring is secured between the output shaft and the interior surface of the opening with electroconductive epoxy.

8. The servo actuator of claim 1, wherein the housing is formed of an electrically conductive material, wherein the housing comprises aluminum, wherein the sensor is an encoder, wherein a width of the output shaft of the geartrain is greater than a length of the output shaft of the geartrain, wherein the drive shaft and the output shaft are coaxial, and wherein the geartrain is a strain wave drive.

9. A servo actuator comprising:
a housing having a plurality of exterior surfaces defining a first cavity and a second cavity, at least one of the plurality of exterior surfaces defining an opening, the opening having an interior surface extending into the first cavity of the housing in a direction orthogonal to the one of the plurality of exterior surfaces;
a motor mounted within the first cavity of the housing, the motor having a drive shaft;
a strain wave drive mounted within the first cavity of the housing and operatively coupled to the drive shaft at an anterior end, the strain wave drive having an output shaft positioned within the opening of the housing;
a sensor mounted within the first cavity of the housing and configured to monitor an angular position of the output shaft;
a servo driver controller board mounted within the second cavity of the housing and electrically connected to the motor and the sensor;
a servo driver power board mounted in parallel relative to the servo driver controller board within the second cavity of the housing and electrically connected to the servo driver controller board; and
a sealing ring positioned between the output shaft and the interior surface of the opening;
wherein the sealing ring is formed of an electrically conductive material; and
wherein the sealing ring is configured to provide shielding from electromagnetic interference.

10. The servo actuator of claim 9, further comprising a cross roller bearing operatively coupling the output shaft and the interior surface of the opening.

11. The servo actuator of claim 9, wherein a width of the output shaft of the strain wave drive is greater than a length of the output shaft of the strain wave drive.

12. The servo actuator of claim 9, wherein a posterior face of the output shaft is coplanar with a face of the housing.

13. The servo actuator of claim 9, wherein the drive shaft and the output shaft are coaxial.

14. The servo actuator of claim 9, wherein the sensor is an encoder ring positioned at the anterior end of the strain wave drive.

15. The servo actuator of claim 9, wherein the servo actuator has a rotational range from −90 degrees to +90 degrees.

16. The servo actuator of claim 9, wherein the servo actuator has a max rotational velocity of more than 160 degrees per second during use.

17. The servo actuator of claim 9, wherein the servo actuator has a rotational acceleration of at least 2,000 degrees per second squared and an RMS acceleration of at least 400 degrees per second squared that is maintainable for an operational time of at least twenty-five minutes under a load of up to 33 Newton-meters or more of applied torque during use.

18. A servo actuator comprising:

a housing having a plurality of exterior surfaces defining a cavity, at least one of the plurality of exterior surfaces defining an opening;

a motor mounted within the cavity of the housing, the motor having a drive shaft;

an output shaft operatively coupled to the drive shaft and positioned within the opening of the housing; and a sealing ring positioned between the output shaft and an interior surface of the opening;

wherein the housing and the sealing ring are formed of an electrically conductive material; and wherein the sealing ring is configured to provide shielding from electromagnetic interference.

19. The servo actuator of claim 18, wherein the sealing ring is secured between the output shaft and the housing with electroconductive epoxy.

\* \* \* \* \*